United States Patent [19]
Tanaka

[11] Patent Number: 5,867,233
[45] Date of Patent: Feb. 2, 1999

[54] ACTIVE MATRIX LIQUID CRYSTAL DISPLAY SUBSTRATE WITH ISLAND STRUCTURE COVERING BREAK IN SIGNAL BUS LINE AND METHOD OF PRODUCING SAME

[75] Inventor: Hiroaki Tanaka, Tokyo, Japan

[73] Assignee: NEC Corporation, Japan

[21] Appl. No.: 828,743

[22] Filed: Mar. 26, 1997

[30] Foreign Application Priority Data

Mar. 28, 1996 [JP] Japan .................................. 8-074509

[51] Int. Cl.⁶ ..................................................... G02F 1/136
[52] U.S. Cl. ............................... 349/43; 349/42; 438/159
[58] Field of Search ................................ 349/42, 43, 47, 349/143; 438/158, 161

[56] References Cited

U.S. PATENT DOCUMENTS

| | | | |
|---|---|---|---|
| 4,738,749 | 4/1988 | Maurice et al. | 349/43 |
| 5,346,833 | 9/1994 | Wu | 438/158 |
| 5,470,768 | 11/1995 | Yanai et al. | 438/161 |
| 5,668,379 | 9/1997 | Ono et al. | 349/43 |
| 5,694,185 | 12/1997 | Oh | 349/42 |

FOREIGN PATENT DOCUMENTS

| | | |
|---|---|---|
| 60-128486 | 7/1985 | Japan . |
| 1-282522 | 11/1989 | Japan . |

*Primary Examiner*—Anita Pellman Gross
*Assistant Examiner*—Tarifur R. Chowdhury
*Attorney, Agent, or Firm*—Hayes, Soloway, Hennessey, Grossman & Hage, P.C.

[57] ABSTRACT

In an active matrix substrate of a liquid crystal display using a TFT as a switching device for each pixel, a gate bus line and a drain bus line extending perpendicular to each other are formed simultaneously by patterning a metal film, and one of the two bus lines is broken to provide a gap across which the other extends. The gap is covered by an island structure of a gate dielectric film and a semiconductor layer formed to provide the TFT, and a supplementary bus line makes direct contact with the broken bus line on both sides of the gap to provide a bridge over the gap. The supplementary bus line is formed together with a pixel electrode by patterning a transparent conductor film. By this arrangement of bus lines, the total number of photolithography steps in the production process is decreased so that the production cost can be reduced.

12 Claims, 6 Drawing Sheets

ABSTRACT

ACTIVE MATRIX LIQUID CRYSTAL DISPLAY SUBSTRATE WITH ISLAND STRUCTURE COVERING BREAK IN SIGNAL BUS LINE AND METHOD OF PRODUCING SAME

BACKGROUND OF THE INVENTION

This invention relates to an active matrix substrate of an active matrix liquid crystal display and a method of producing the active matrix substrate.

The use of active matrix liquid crystal displays is rapidly expanding. In most of the current active matrix liquid crystal displays the switching device for each pixel is a thin-film transistor (TFT) using a semiconductor film. In most cases the semiconductor is amorphous silicon, but in some cases polycrystalline silicon or a compound semiconductor such as CdSe is used.

Figure 13:
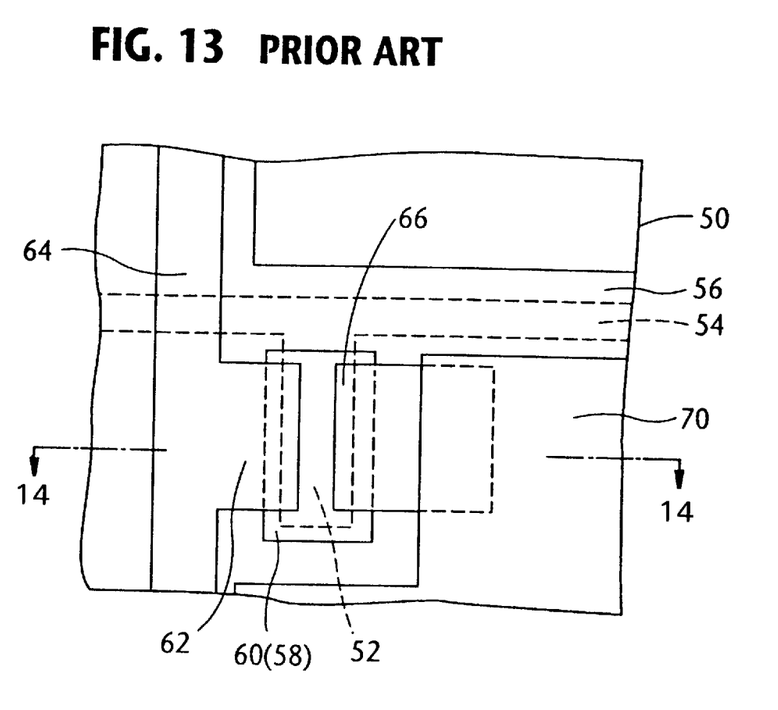
FIG. 13 is a fragmentray plan view of a conventional active matrix substrate.
Figure 14:
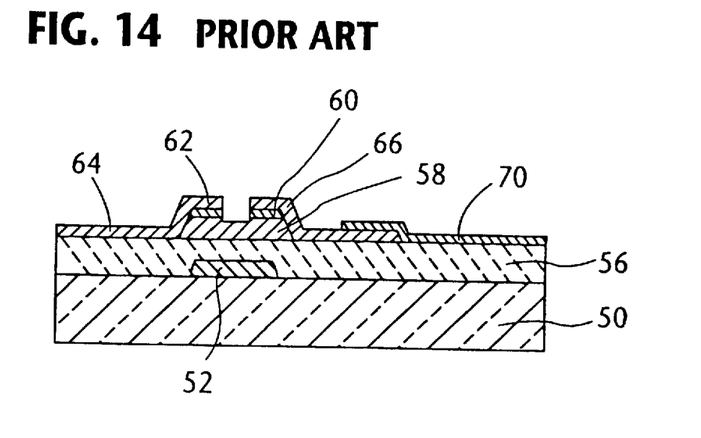
FIG. 14 is a schematic sectional view taken along the line 14—14 in FIG. 13.

FIGS. 13 and 14 of the accompanying drawings show the construction of a coventional active matrix substrate of a liquid crystal display having a TFT for each pixel. On a transparent insulator substrate 50 such as a glass substrate, a gate electrode 52 and a gate bus line 54 are formed by patterning a metal film such as a chromium film. The electrode 52 and the bus line 54 are buried in a transparent dielectric film 56 such as a silicon nitride film. On the dielectric film 56, an island structure of a semiconductor film 58 such as an amorphous silicon film and an n-type semiconductor film 60 such as a phosphorus-doped amorphous silicon film is formed above the gate electrode 52 to provide a TFT. A drain electrode 62, a drain bus line 64 and a source electrode 66 are formed by patterning a metal film such as a chromium film or an aluminum film. A pixel electrode 70, which is in contact with the source electrode 66, is formed by patterning a transparent conductor film such as an indium-tin oxide (ITO) film. The gate bus line 54 and the drain bus line 64 extend perpendicular to each other, but these two bus lines must not intersect each other. So, the two bus Lines 56 and 64 are formed in two different layers.

In producing this structure, five photolithography steps are needed. The first photolithography is for forming the gate electrode 52 and gate bus line 54. The second is for forming the island structure of the semiconductor films 58, 60. The third is for forming contact holes in the dielectric film 56 to provide access to the gate bus line. The fourth is for forming the drain electrode 62, drain bus line 64 and the source electrode 66. The fifth is for forming the transparent pixel electrode 70.

If the gate bus line and the drain bus line can be formed in the same layer, there arises a possibility of decreasing the total number of photolithography steps and consequently reducing the production cost. In this connection, JP-A 60-128486 (1985) proposes the structure shown in FIGS. 15–16 of the accompanying drawings.

Figure 15:
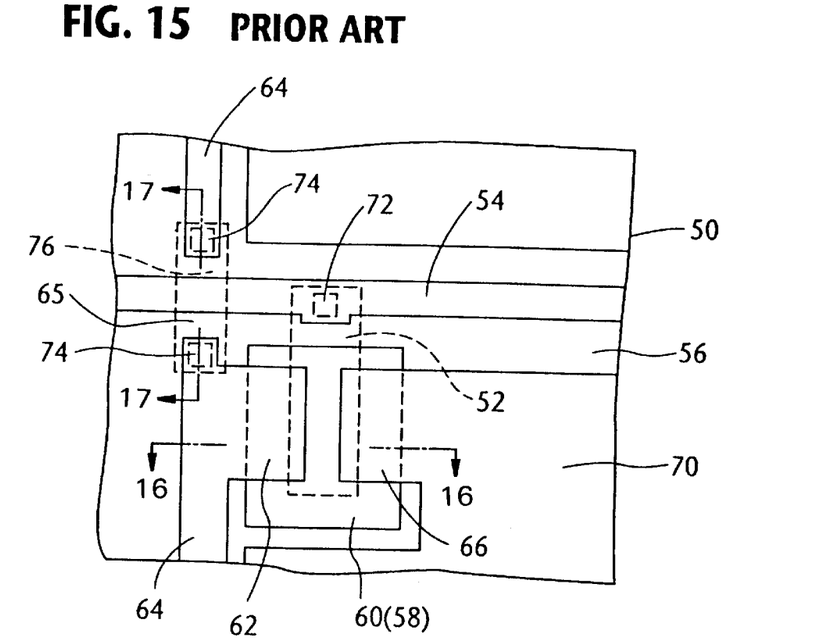
FIG. 15 is a fragmentary plan view of another known active matrix substrate.
Figure 16:
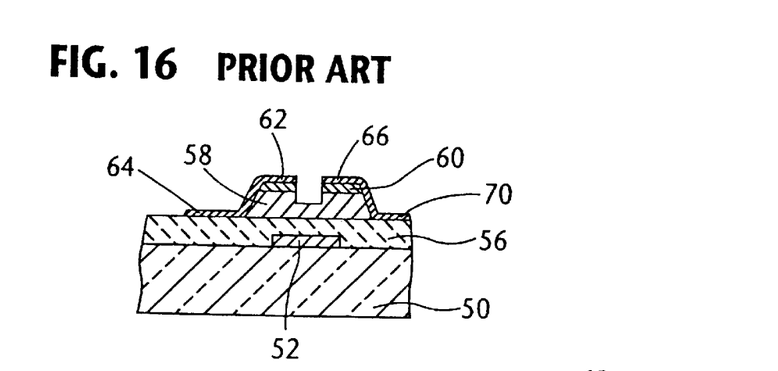
FIGS. 16 and 17 are schematic sectional views taken along the line 16—16 and line 17—17 in FIG. 14, respectively.
Figure 17:
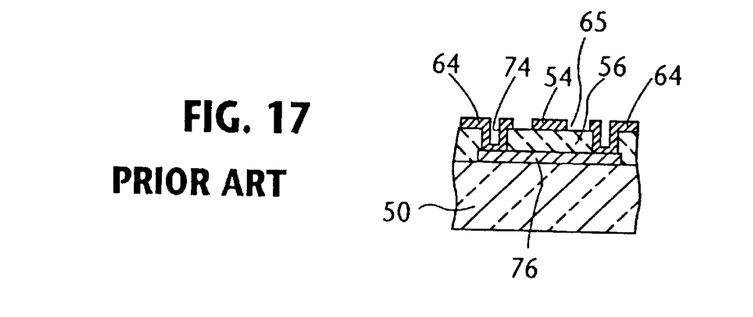

The active matrix substrate in FIGS. 15–17 differs from the active matrix substrate in FIGS. 13–14 in the following points. The gate bus line 52 is formed on the dielectric film 56. A contact hole 72 is used to connect the gate bus line 54 to the gate electrode 52 under the dielectric film 56. The drain bus line 64 on the dielectric film 56 is broken to provide a gap 65 so that the gate bus line 54 extends across the gap 58 without intersecting the drain bus line 64. Under the gap 65, a bridge electrode 76 is formed on the glass substrate 50 under the dielectric film 56, and the drain bus line 64 on both sides of the gate bus line 54 is connected to the bridge electrode 76 by using contact holes 74. In this structure the gate bus line 54 and the drain bus line 64 are formed in the same layer by patterning a metal film. However, the production of this structure still entails four photolithography steps: the first for forming the gate electrode 52 and the bridge electrode 76, the second for forming the island structure of the semiconductor films 58, 60, the third for forming the contact holes 72, 74 and the fourth for forming the drain electrode 62, drain bus line 64, source electrode 66 and the pixel electrode 70. Besides, this structure is not suited to large area displays because the total resistance of bus lines, viz. wiring resistance, greatly increases for the following reason. In this case the bus lines 54, 64 are formed of a transparent conductor such as ITO since the bus lines 54, 64 and the pixel electrode 70 are formed simultaneously. Conventional transparent conductor films are greatly higher in resistivity than metal films. For example, volume resistivity of ITO film is about 20 times as high as that of chromium film.

SUMMARY OF THE INVENTION

The present invention relates to an active matrix substrate of an active matrix liquid crystal display using TFTs as switching devices, and it is an object of the invention to provide an improved active matrix substrate which can be produced at a reduced cost by decreasing the total number of photolithography steps without increasing wiring resistance.

It is another object of the invention to provide a method of producing the active matrix substrate according to the invention.

An active matrix substrate according to the invention comprises an insulating substrate, a gate bus line and a drain bus line which are formed simultaneously by patterning a metal film on the substrate and extend perpendicular to each other. One of the gate bus line and the drain bus line is broken to provide a gap across which the other extends. The active matrix substrate further comprises an island structure of a laminate of a gate dielectric film and a semiconductor layer formed on the substrate at least over a TFT area and a bus line intersection area which contains the aforementioned gap, a gate electrode on the dielectric film in the TFT area, a source electrode and a drain electrode each in contact with the semiconductor layer in the TFT area, a transparent pixel electrode connected to the source electrode, and a supplementary bus line which is in direct contact with said one of the gate bus line and the drain bus line on both sides of said gap to provide a bridge over the gap and is separated from the other bus line by the island structure in the intersection area.

Preferably the supplementary bus line is formed together with the pixel electrode by patterning a transparent conductor film.

A method of producing an active matrix substrate according to the invention comprises the following steps: (a) depositing a metal film on a surface of an insulating substrate; (b) patterning the metal film to form a gate electrode, a gate bus line and a drain bus line which extends perpendicular to the gate bus line, one of the gate bus line and the drain bus line being broken to provide a gap across which the other extends without intersecting said one; (c) forming an island structure of a gate dielectric film and a semiconductor layer on the substrate at least over a TFT area containing the gate electrode and a bus line area containing said gap and said other of the gate bus line and the drain bus line; (d) depositing a transparent conductor film on the substrate inclusive of the island structure and the broken bus line; and (e) patterning the transparent conductor film to form a source electrode and a drain electrode on the island structure in the TFT area, a pixel electrode contiguous to the source electrode and a supplementary bus line which extends over the island structure above said gap and makes direct contact with said one of the gate bus line and the drain bus line on both sides of said gap to provide a bridge over the gap.

Another method of producing an active matrix substrate according to the invention comprises the following steps: (a) depositing a transparent conductor film on an insulating substrate; (b) patterning the transparent conductor film to form a source electrode, a drain electrode, a pixel electrode contiguous to the source electrode and a supplementary bus line; (c) forming an island structure of a semiconductor layer and a gate dielectric film on the substrate at least over a TFT area containing the source and drain electrodes and a bus line intersection area through which the supplementary bus line extends, the island structure being formed such that a portion of the drain electrode and the supplementary bus line on both sides of the intersection area are exposed; (d) depositing a metal film on the substrate inclusive of the island structure and the supplementary bus line; and (e) patterning the metal film to form a gate electrode on the island structure in the TFT area, a gate bus line and a drain bus line, wherein one of the gate bus line and the drain bus line extends on the island structure in the intersection area and the other is in direct contact with the supplementary bus line and is broken in the intersection area to provide a gap across which the island structure and the bus line thereon extend.

In the present invention, the gate bus line and the drain bus line are simultaneously formed by patterning a metal film. To prevent intersection of the two bus lines, one of the two bus lines is broken to provide a gap across which the other bus line extends. To complete the broken bus line, the active matrix substrate has a supplementary bus line which makes direct contact with the broken bus line on both sides of the gap to provide a bridge over the gap. To separate the supplementary bus line from the unbroken bus line, the island structure of the dielectric film and the semiconductor layer is used. No contact hole is used for bridging over the gap in the broken bus line. The supplementary bus line can be formed together with the pixel electrode. By these measures, the present invention decreases the total number of photolithography steps in the production process. In this invention, only three photolithography steps are needed. Accordingly the production cost can be reduced.

In this invention the total resistance of bus lines does not significantly increase because both the gate and drain bus lines are formed of a metal film while a transparent conductor film is used only for the bridge section of the broken bus line.

Furthermore, this invention has the merit of increasing the yield of acceptable products because the probability of contamination by particles or the like lessens as a result of the decrease in the number of photolithography steps.

BRIEF DESCRIPTION OF THE DRAWINGS

FIGS. 1 to 3 illustrate the initial step of a process of producing an active matrix substrate according to the invention, wherein

FIGS. 4 to 6 illustrate the next step of the process, wherein

FIGS. 7 to 9 illustrate the last step of the process, wherein

FIGS. 10 to 12 show another active matrix substrate according to the invention, wherein

DESCRIPTION OF THE PREFERRED EMBODIMENTS

As an embodiment of the invention, FIGS. 1 to 9 illustrate a process of producing an active matrix substrate of a liquid crystal display. The structure of the obtained active matrix substrate can be seen in FIGS. 7–9.

Figure 1:
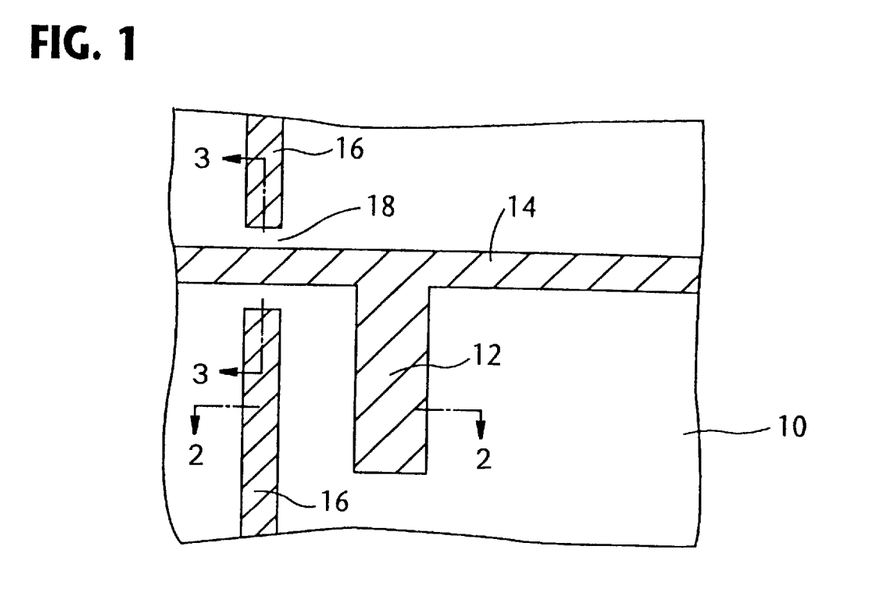
FIG. 1 is a fragmentary plan view.
Figure 2:
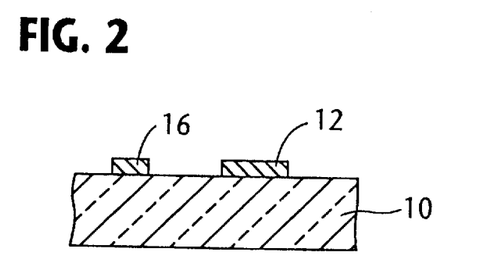
FIGS. 2 and 3 are schematic sectional views taken along the line 2—2 and line 3—3 in FIG. 1, respectively.
Figure 3:
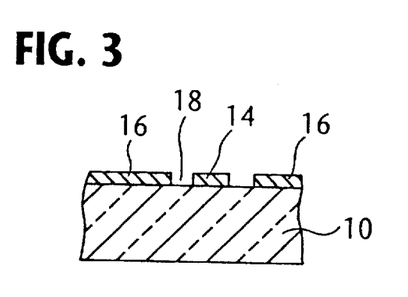

FIGS. 1–3 illustrate the initial step. On a transparent glass substrate 10, a metal film such as a chromium film is deposited by sputtering, and the metal film is patterned by photolithography and subsequent wet or dry etching to form a gate electrode 12, a gate bus line 14 and a drain bus line 16. The two bus lines 14 and 16 are perpendicular to each other. To prevent the intersection of the two bus lines 14 and 16, the drain bus line 16 is broken in the intersection zone to provide a gap 18 across which the gate bus line 14 extends. Alternatively, the gate bus line 14 may be broken instead of the drain bus line 16.

Figure 4:
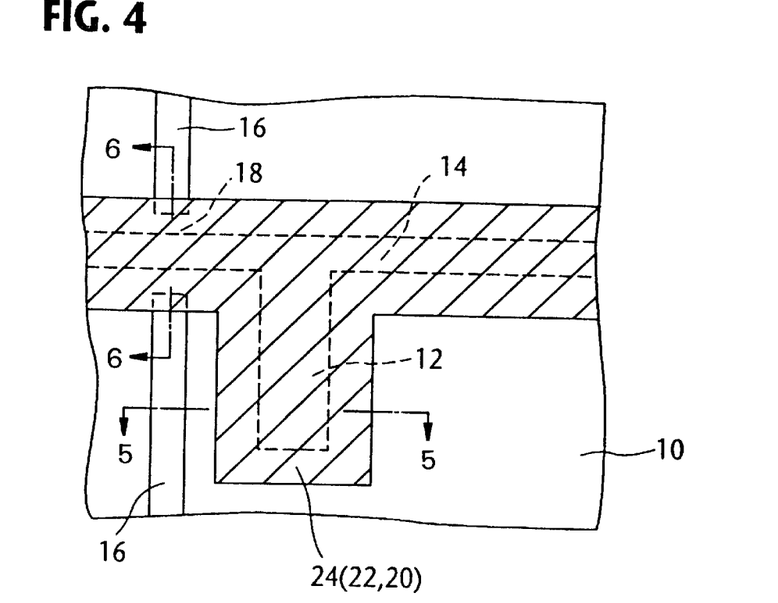
FIG. 4 is a fragmentary plan view, and FIGS, 5 and 6 are schematic sectional views taken along the line 5—5 and line 6—6 in FIG. 4, respectively.
Figure 5:
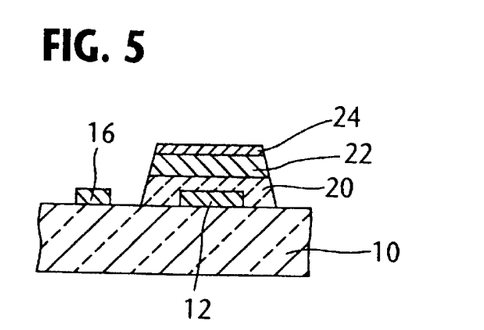
Figure 6:
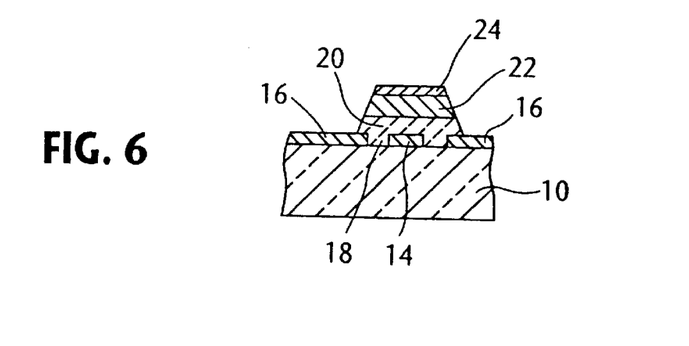

Next, referring to FIGS. 4–6, a gate dielectric film 20 such as a silicon nitride film is deposited on the substrate 10. Successively, a semiconductor film 22 such as an amorphous silicon film is deposited on the dielectric film 20, and an n-type semiconductor film 24 such as a phosphorus-doped amorphous silicon film on the semiconductor film 22. Usually, these three films 20, 22, 24 are each deposited by a plasma-assisted chemical vapor depostion (CVD) technique. Then the three films 20, 22, 24 are patterned together by photolithography and subsequent dry etching to form an island structure over a TFT area containing the gate electrode 12 and over the gate bus line 14 and the gap 18 in the drain bus line 16. By the patterning of the films 20, 22, 24, the drain bus line 16 is exposed on both sides of the gate bus line 14.

Figure 7:
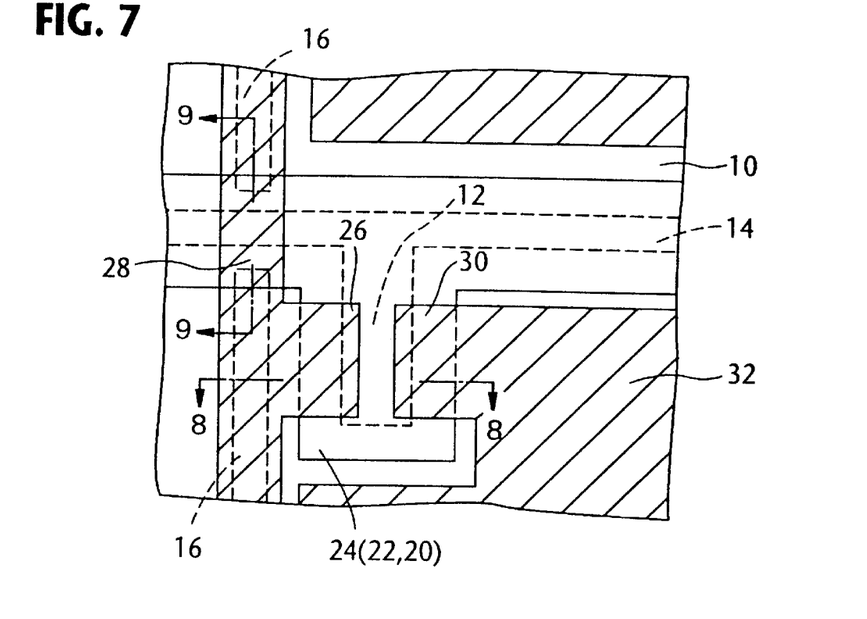
FIG. 7 is a fragmentary plan view.
Figure 8:
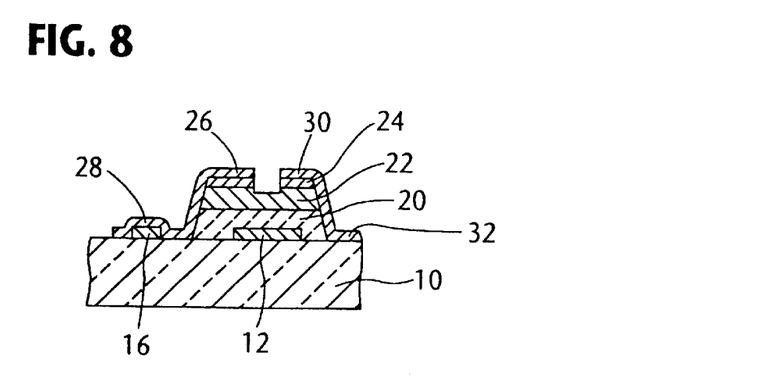
FIGS. 8 and 9 are schematic sectional views taken along the line 8—8 and line 9—9 in FIG. 7, respectively.
Figure 9:
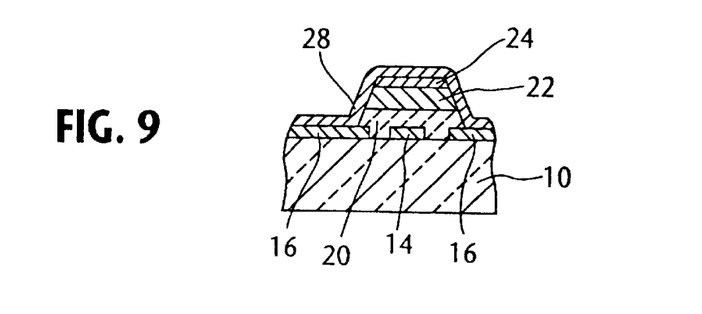

Next, referring to FIGS. 7–9, on the substrate 10 in the state of FIGS. 4–6, a transparent conductor film such as an ITO film is deposited by sputtering, and the deposited film is patterned by photolithography and subsequent dry etching to form a drain electrode 26, a supplementary bus line 28 which is contiguous to the drain electrode 26, a source electrode 30, a pixel electrode 32 which is contiguous to the source electrode 30. The supplementary bus line 28 extends over the island structure of the films 20, 22, 24 above the gap 18 in the drain bus line 16 and makes direct contact with the drain bus line 16 on both sides of the gap 18. That is, the supplementary bus line 28 bridges the gap 18 and connects the drain bus line 16 to the drain electrode 26 to complete the drain bus line. After patterning the transparent conductor film, the n-type semiconductor film 24 is etched by dry etching in the region between the drain and source electrodes 26 and 30 to provide the channel of the TFT.

The above described process entails only three photolithography steps, i.e., the first photolithography for forming the gate electrode 12, gate bus line 14 and the broken drain bus line 16, the second for forming the island structure of the dielectric film 20 and semiconductor films 22, 24, and the third for forming the drain electrode 26, supplementary bus line 28, source electrode 30 and pixel electrode 32.

Figure 10:
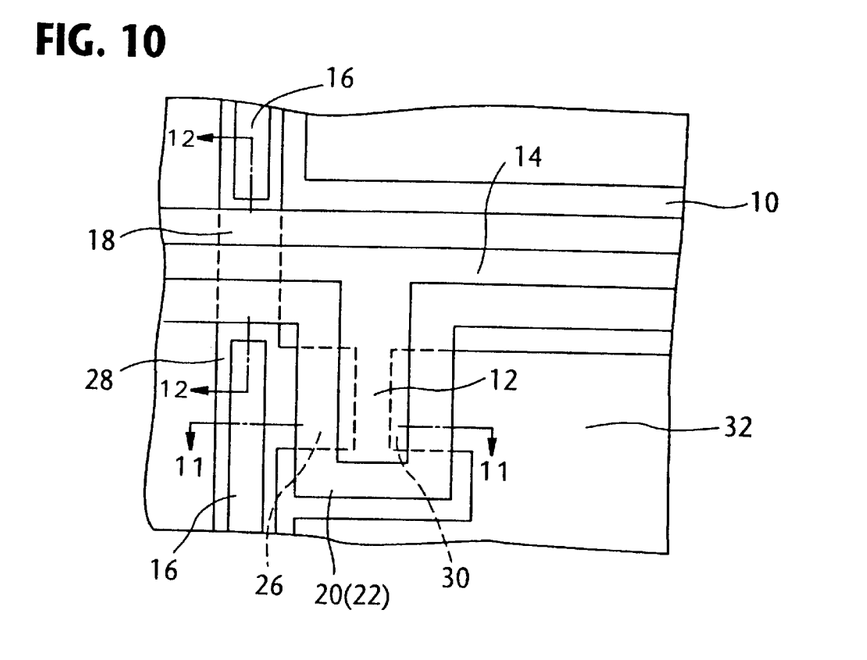
FIG. 10 is a fragmentary plan view.
Figure 11:
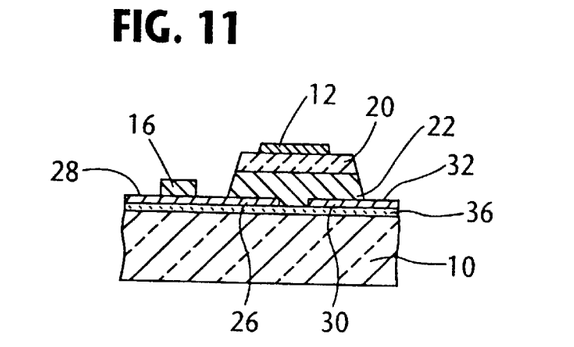
FIGS. 11 and 12 are schematic sectional views taken along the line 11—11 and line 9—9 in FIG. 10, respectively.
Figure 12:
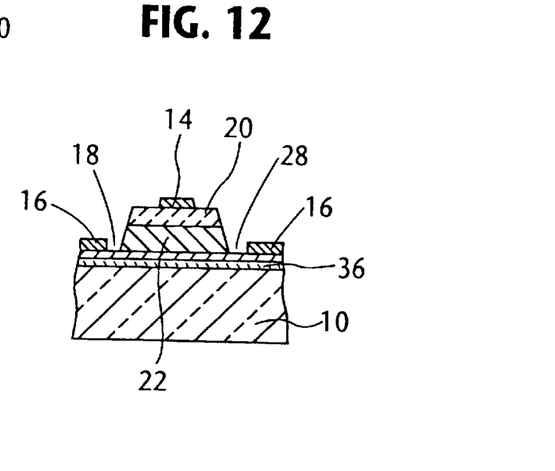

FIGS. 10–12 show another embodiment of the invention. In the embodiment shown in FIGS. 6–9 the TFT is of the inverted structure, whereas in FIGS. 10–12 the TFT is of the normal structure.

On the glass substrate 10, a silicon oxide film 36 is deposited by sputtering or by CVD. An ITO film (or another transparent conductor film) is deposited on the silicon oxide film 36 by sputtering, and the ITO film is patterned by photolithography and subsequent wet etching to form a drain electrode 26, a supplementary bus line 28 which is contiguous to the drain electrode 26, a source electrode 30 and a pixel electrode 32 which is contiguous to the source electrode 30. The supplementary bus line 28 extends in the same direction as the drain bus line (16) to be formed later. The silicon oxide film 36 is left unpatterned.

The patterned ITO film is treated, together with the silicon oxide film 36, with a plasma of phosphine PH$_3$. The silicon oxide film 36 is formed for the purpose of providing selectivity in this phosphine plasma treatment. After the plasma treatment, an amorphous silicon film (or another semiconductor film) 22 and a silicon nitride film (or another dielectric film) 20 are successively deposited each by plasma-assisted CVD, and the two films 20, 22 are patterned together by photolithography and subsequent dry etching to form an island structure over a TFT area containing the drain and source electrodes 26 and 30 and an elongate area in which the gate bus line is to be formed later. A portion of the drain electrode 26 is left exposed. Next, a metal film such as a chromiun film is deposited over the whole area, and the metal film is patterned by photolithography and subsequent wet or dry etching to form a gate electrode 12 and a gate bus line 14 on the island structure of the semiconductor and dielectric films 22, 20 and a drain bus line 16 on the supplementary bus line 28. The drain bus line 16 is broken to provide a gap 18 across which the gate bus line 14 extends. However, under the island structure on which the gate bus line 14 extends, the supplementary bus line 28 bridges the gap 18 to complete the drain bus line.

Also in this embodiment, the fabrication process entails only three photolithography steps.

What is claimed is:

1. An active matrix substrate of an active matrix liquid crystal display using a thin-film transistor (TFT) as a switching device for each pixel, the active matrix substrate comprising:

an insulating substrate;

a gate bus line and a drain bus line which are formed simultaneously by patterning a metal film on said substrate and extend perpendicular to each other, one of the gate bus line and the drain bus line being broken to provide a gap across which the other extends;

an island structure of a laminate of a gate dielectric film and a semiconductor layer formed on said substrate at least over a TFT area and a bus line intersection area which contains said gap;

a gate electrode on said dielectric film in said TFT area;

a source electrode and a drain electrode each in contact with said semiconductor layer in said TFT area;

a transparent pixel electrode connected to said source electrode; and a supplementary bus line which is in direct contact with said one of the gate bus line and the drain bus line on both sides of said gap to provide a bridge over said gap and is separated from the other bus line by said island structure in said intersection area.

2. An active matrix substrate according to claim 1, wherein said supplementary bus line and said pixel electrode are formed simultaneously by patterning a transparent conductor film.

3. An active matrix substrate of an active matrix liquid crystal dispaly using a thin-film transistor (TFT) as a switching device for each pixel, the active matrix substrate comprising:

an insulating substrate;

a gate electrode formed on a surface of said substrate;

a gate bus line and a drain bus line which are formed on said surface of said substrate and extend perpendicular to each other, one of the gate bus line and the drain bus line is broken to provide a gap across which the other extends without intersecting said one;

an island structure of a gate dielectric film and a semiconductor layer formed on said surface of said substrate at least over a TFT area containing said gate electrode and a bus line intersection area containing said gap;

a source electrode and a drain electrode formed on said island structure;

a transparent pixel electrode which is formed on said surface of said substrate and is contiguous to said source electrode; and a supplementary bus line which extends over said island structure in said intersection area and makes direct contact with said one of the gate bus line and the drain bus line on both sides of said gap to provide a bridge over said gap.

4. An active matrix substrate according to claim 3, wherein said gate electrode, said gate bus line and said drain bus line are formed simultaneously by patterning a metal film, said source electrode, said drain electrode, said pixel electrode and said supplementary bus line being formed simultaneously by patterning a transparent conductor film.

5. An active matrix substrate according to claim 3, wherein said one of the gate bus line and the drain bus line is the drain bus line.

6. An active matrix substrate of an active matrix liquid crystal dispaly using a thin-film transistor (TFT) as a switching device for each pixel, the active matrix substrate comprising:

an insulating substrate;

a source electrode and a drain electrode formed on a surface of the substrate;

a transparent pixel electrode which is formed on said surface of the substrate and is contiguous to said source electrode;

a supplementary bus line which is formed on said surface of the substrate;

an island structure of a gate dielectric film and a semiconductor layer formed on said surface of the substrate at least over a TFT area including the source and drain electrodes and a bus line intersection area through which said supplementary bus line extends;

a gate electrode formed on said island structure; and a gate bus line and a drain bus line which extend perpendicular to each other, wherein one of the gate bus line and the drain bus line extends on said island structure in said intersection area and the other is in direct contact with said supplementary bus line and is broken in said intersection area to provide a gap across which said island structure and the bus line thereon extend.

7. An active matrix substrate according to claim 6, wherein said source electrode, said drain electrode, said pixel electrode and said supplementary bus line are formed simultaneously by patterning a transparent conductor film, said gate electrode, said gate bus line and said drain bus line being formed simultaneously by patterning a metal film.

8. An active matrix substrate according to claim 6, wherein said one of the gate bus line and the drain bus line is the drain bus line.

9. A method of producing an active matrix substrate of an active matrix liquid crystal display using a thin-film transistor (TFT) as a switching device for each pixel, the method comprising the steps of:

(a) depositing a metal film on an insulating substrate;

(b) patterning said metal film to form a gate electrode, a gate bus line and a drain bus line which extends perpendicular to said gate bus line, one of said gate bus line and said drain bus line being broken to provide a gap across which the other extends without intersecting said one;

(c) forming an island structure of a gate dielectric film and a semiconductor layer on said substrate at least over a TFT area containing said gate electrode and a bus line area containing said gap and said other of the gate bus line and the drain bus line;

(d) depositing a transparent conductor film on said substrate inclusive of said island structure and the broken bus line; and (e) patterning said transparent conductor film to form a source electrode and a drain electrode on said island structure in said TFT area, a pixel electrode contiguous to said source electrode and a supplementary bus line which extends over said island structure above said gap and makes direct contact with said one of the gate bus line and the drain bus line on both sides of said gap to provide a bridge over said gap.

10. A method according to claim 9, wherein said one of the gate bus line and the drain bus line is the drain bus line, said supplementary bus line being contiguous to said drain electrode.

11. A method of producing an active matrix substrate of an active matrix liquid crystal display using a thin-film transistor (TFT) as a switching device for each pixel, the method comprising the steps of:

(a) depositing a transparent conductor film on an insulating substrate;

(b) patterning said transparent conductor film to form a source electrode, a drain electrode, a pixel electrode contiguous to said source electrode and a supplementary bus line;

(c) forming an island structure of a semiconductor layer and a gate dielectric film on said substrate at least over a TFT area containing the source and drain electrodes and a bus line intersection area through which said supplementary bus line extends, the island structure being formed such that a portion of the drain electrode and said supplementary bus line on both sides of said elongate area are exposed;

(d) depositing a metal film on said substrate inclusive of said island structure and said supplementary bus line; and (e) patterning said metal film to form a gate electrode on said island structure in said TFT area together with a gate bus line and a drain bus line, wherein one of the gate bus line and the drain bus line extends on said island structure in said intersection area and the other is in direct contact with said supplementary bus line and is broken in said intersection area to provide a gap across which said island structure and the bus line thereon extend.

12. A method according to claim 11, wherein said one of the gate bus line and the drain bus line is the gate bus line.

* * * * *